United States Patent [19]
Berrevoets et al.

[11] Patent Number: 5,817,900
[45] Date of Patent: Oct. 6, 1998

[54] PROCESS FOR HYDROTREATING RESINS TO LIGHTEN COLOR

[75] Inventors: Erik Berrevoets, Middelburg; Jan van Drongelen, Grijpskerke, both of Netherlands

[73] Assignee: Hercules Incorporated, Wilmington, Del.

[21] Appl. No.: 595,115

[22] Filed: Feb. 1, 1996

[51] Int. Cl.$^6$ ........................................................ C08F 6/24
[52] U.S. Cl. .................... 585/250; 585/269; 585/270; 585/275; 585/276; 528/483; 528/485; 528/490
[58] Field of Search .................................... 585/250, 269, 585/270, 275, 276; 528/483, 485, 490

[56] References Cited

U.S. PATENT DOCUMENTS

| | | | |
|---|---|---|---|
| 2,349,210 | 5/1944 | Traylor | 528/483 |
| 2,560,492 | 7/1951 | Sparks et al. | 250/83.7 |
| 2,689,232 | 9/1954 | Gerhart | 260/23.7 |
| 2,793,986 | 5/1957 | Lanning | 196/35 |
| 2,819,289 | 1/1958 | Luben | 260/450 |
| 2,963,467 | 12/1960 | Small | 260/82 |
| 3,029,121 | 4/1962 | Collins | 528/483 |
| 3,040,009 | 6/1962 | Wadsworth et al. | 260/82 |
| 3,084,147 | 4/1963 | Wilks | 260/93.1 |
| 3,100,808 | 8/1963 | Dyer | 260/683.9 |
| 3,331,824 | 7/1967 | Folzenlogen et al. | 528/483 |
| 3,442,877 | 5/1969 | Moritz et al. | 260/82 |
| 3,484,421 | 12/1969 | Pine et al. | 260/82 |
| 3,882,049 | 5/1975 | Bertolacini et al. | 252/466 |
| 3,968,088 | 7/1976 | Asai et al. | 526/283 |
| 4,206,300 | 6/1980 | Talsma et al. | 528/483 |
| 4,315,842 | 2/1982 | Tsuchiya et al. | 260/28.5 |
| 4,330,448 | 5/1982 | Iwata | 526/79 |
| 4,360,622 | 11/1982 | Tsuchiya | 524/275 |
| 4,413,067 | 11/1983 | Tsuchiya et al. | 523/172 |
| 4,419,497 | 12/1983 | Tsuchiya et al. | 525/338 |
| 4,650,829 | 3/1987 | Bossaert et al. | 525/99 |
| 4,684,707 | 8/1987 | Evans | 526/290 |
| 4,897,175 | 1/1990 | Bricker et al. | 208/12 |
| 4,927,885 | 5/1990 | Hayashida et al. | 525/211 |
| 4,952,639 | 8/1990 | Minomiya et al. | 525/327.9 |
| 4,992,157 | 2/1991 | Bricker et al. | 208/12 |
| 5,077,386 | 12/1991 | Teng et al. | 528/487 |
| 5,109,081 | 4/1992 | Pannell | 526/68 |
| 5,171,793 | 12/1992 | Johnson et al. | 525/332.1 |
| 5,177,163 | 1/1993 | Chu et al. | 526/76 |
| 5,292,864 | 3/1994 | Wood et al. | 528/483 |
| 5,294,697 | 3/1994 | Magni et al. | 528/488 |
| 5,410,004 | 4/1995 | Williams | 526/237 |
| 5,491,214 | 2/1996 | Daughenbaugh et al. | 528/483 |
| 5,502,140 | 3/1996 | Daughenbaugh et al. | 526/283 |

FOREIGN PATENT DOCUMENTS

| | | |
|---|---|---|
| 046634 | 3/1982 | European Pat. Off. . |
| 378104 | 7/1990 | European Pat. Off. . |
| 4103279 | 8/1992 | Germany . |
| 15802 | 1/1988 | Japan . |
| 2251-525A | 10/1990 | Japan . |
| 194629 | 8/1993 | Japan . |
| 873067 | 7/1961 | United Kingdom . |

OTHER PUBLICATIONS

Chemical Abstracts, vol. 86, No. 4; Apr. 4, 1977; Abstract No. 90940j, "Hydrogenating Hydrocarbon Resins".
94104628 EP Search Rpt. Date Unknown.
95101497.6 EP Search Rpt. Date Unknown.

*Primary Examiner*—Margaret Medley
*Attorney, Agent, or Firm*—Robert P. O'Flynn O'Brien; Joanne W. Patterson

[57] ABSTRACT

The color of hydrocarbon resins having carbon-carbon double bonds and containing color bodies is lightened by a hydrotreating process consisting essentially of contacting the resin with hydrogen at a hydrogen pressure of 1 to about 20 bar (14.5 to about 290 psi) in the presence of a catalyst that promotes the hydrogenation of the color bodies without substantially changing the softening point or the content of carbon-carbon double bonds in the resin. The preferred catalyst is nickel/zinc oxide on $SiO_2$.

46 Claims, No Drawings

PROCESS FOR HYDROTREATING RESINS TO LIGHTEN COLOR

FIELD OF THE INVENTION

This invention relates to a process for lightening the color of resins and resins produced by this process.

BACKGROUND OF THE INVENTION

Methods for hydrogenating hydrocarbon resins to lighten the color are well known and generally produce a product that is "water white" in color. The aliphatic and/or aromatic unsaturation present in the resin is partially or completely eliminated, providing a product with improved oxidative stability, UV resistance and color stability. However, particularly in the case of resins derived from aromatic feedstreams, hydrogenation also alters the physical properties of the resin, which can make it less desirable for use in products such as adhesives, caulks and sealants, plastic and rubber modifiers, and printing inks.

Processes for improving the color of "hydrocarbon fractions" and hydrocarbon resins by selective hydrogenation of color bodies and color body precursors have been proposed. For example, U.S. Pat. Nos. 4,897,175 and 4,992,157 disclose a process for improving the color and color stability of "hydrocarbon fractions" such as kerosene, gasoline, straight run naphthas, diesel fuel and lubricating oils. The "hydrocarbon fractions" are contacted with hydrogen in the presence of a selective hydrogenation catalyst such as a Group VIII metal or a sulfided Group VIII metal, which may be on a porous support. Color bodies and color body precursors are hydrogenated.

U.S. Pat. No. 5,171,793 discloses the preparation of heat-stable, light colored resins by hydrogenation of resins produced by thermally polymerizing a feedstock containing a vinyl aromatic component, a cyclodiene component and optionally an acyclic diene component. The resin solution that results from the thermal polymerization is stripped to a softening point of 80°–200° C. before hydrogenation. The hydrogenation is carried out in the presence of (1) a hydrogenation catalyst selected from Group VIII metals, Group VI metals and Group VII metals, which may be activated or carried on a support; (2) a solvent diluent, and (3) an olefinic diluent. Chromophores and double bonds in the resin molecule are hydrogenated. U.S. Pat. No. 2,963,467 discloses a process for making light colored hydrocarbon resins with a softening point above 85° C. by hydrogenating in the presence of a catalyst such as nickel, reduced nickel, nickel sulfide, copper chromite, copper molybdate, and molybdenum disulfide. However, the process also requires initial stripping of the polymerized resin to at least a 100° C. softening point, followed by redissolving the resin in a diluent, and stripping the hydrogenated product at low temperatures and under reduced pressure.

U.S. Pat. No. 5,491,214 (European Patent Application 617,053), which is incorporated herein by reference, describes a process for hydrotreating hydrocarbon resins in the presence of a catalyst that promotes the hydrogenation of color bodies without changing the content of carbon-carbon double bonds in the resin or its physical properties. A hydrogen pressure of 300 psi up to 1200 psi was used, and the preferred catalysts were copper chromite and copper/zinc.

There is still a need for additional processes to reduce the color of a resin without changing its other desirable physical characteristics.

SUMMARY OF THE INVENTION

The process of this invention for lightening the color of hydrocarbon resins having carbon-carbon double bonds and containing color bodies, comprising providing a resin having a weight average molecular weight (Mw) of about 250 to about 10,000, and contacting with hydrogen at a hydrogen pressure of 1 to about 20 bar (14.5 to about 290 psi) in the presence of a catalyst that promotes hydrogenation of the color bodies without substantially changing the softening point or the content of carbon-carbon double bonds in the resin.

The invention is also directed to resins produced by this process.

The invention provides a method for hydrotreating normally colored resinous materials to lighten the color, preferably to water white (less than Gardner color 1). Normally measured properties other than color are substantially unchanged. When a Ni/Zn oxide catalyst is used for the hydrotreating process, activity of the catalyst for color reduction remains essentially unchanged in spite of a high chlorine load. Products containing these lighter colored resins exhibit properties substantially the same as those of products that contain untreated resins, while providing a more pleasing visual appearance. The use of a low hydrogen pressure reduces equipment and operating costs associated with the practice of the process of this invention.

DETAILED DESCRIPTION OF THE INVENTION

The process of this invention for contacting a colored resin with hydrogen in the presence of a catalyst is subsequently referred to as "hydrotreating". The process is a selective hydrogenation process, since the color bodies present in the resin are hydrogenated while the content of carbon-carbon double bonds in the resin remains substantially unchanged. Carbon-carbon double bonds include both ethylenic and aromatic double bonds. In addition, color body precursors are not hydrogenated in this process. In conventional catalytic hydrogenation processes, the color bodies, the color body precursors and carbon-carbon double bonds in the resin are hydrogenated.

The process of this invention can be used to lighten the color of a wide variety of hydrocarbon resins such as C-9 resins, C-5 resins, mixed C-9/C-5 resins, vinyl aromatic-modified C-5 resins, dicyclopentadiene resins, aromatic-modified dicyclopentadiene resins, terpene resins terpene-phenolic resins, mixed C-9/C-4 resins, and coumerone-indene resins. The term "resin" as used in this specification indicates a low molecular weight synthetic polymer made by polymerizing unsaturated monomers either thermally or in the presence of an acidic catalyst, e.g., a Friedel-Crafts catalyst. These polymers have a weight average molecular weight ($M_w$) of about 250–10,000, preferably about 400–6,000, and most preferably about 400–2,000. The notations "C-5" and "C-9" indicate that the monomers from which the resins are made are predominantly hydrocarbons having 4–6 and 8–10 carbon atoms respectively. All of the resins mentioned above typically have a yellow or amber color before treatment. The softening point of the resin to be treated is not critical, unlike known hydrogenation processes where the resinous starting material is stripped to obtain a resin with a particular softening point before hydrogenating.

Catalysts useful in the process of this invention are hydrogenation catalysts that are selective enough in their action so that only the color bodies are hydrogenated. Color bodies are highly conjugated, polyunsaturated organic compounds that may also contain polar atoms such as oxygen, sulfur and nitrogen, e.g., indoles and quinones. The carbon-carbon double bonds in the resin are not substantially hydrogenated. Therefore the properties of the resin that are commonly measured, e.g., softening point, cloud point, molecular weight, and heat stability, are also essentially unaffected. In addition, color body precursors are not substantially hydrogenated. Color body precursors are defined as colorless materials that become colored after aging.

Catalysts with the required selectivity can be selected from the metals of Groups VIII, VIB, IB and IIB of the Periodic Table and oxides thereof. These metals or their oxides can be used alone or in combination. The metals or metal oxides can be used directly or can be carried on a suitable support such as silica, alumina, or carbon. Nickel, nickel/zinc, and palladium are preferred. Nickel/zinc oxide on a silica support is most preferred. It should be noted that the selectivity of a particular catalyst can be different under different processing conditions.

Additional processing steps such as stripping the resin to a particular softening point before hydrotreating and then redissolving, or stripping the resin after hydrotreating to a particular softening point, can be used. However, one of the advantages of this invention is that they are not needed. Standard procedures such as isolating the hydrotreated resin by stripping and steam sparging, or neutralizing catalyst residues from the polymerization of the monomers used to make the resins can be included. Quenching agents such as organic phosphites and reactive diluents such as olefinic diluents are not required. A reactive diluent is defined as a diluent that reacts with the hydrogen or the resin. Such diluents are described in U.S. Pat. No. 5,171,793, which is incorporated herein by reference.

The temperature, pressure, reaction time and amount of catalyst used in the process of this invention depend upon various factors such as the type of resin that is being treated, the final color desired and the economics of the process, e.g., some catalysts are very expensive and it would not be commercially feasible to use large amounts. Preferably the hydrogen pressure ranges between 1 and about 20 bar (14.5 to about 290 psi), more preferably between 1 and about 15 bar (14.5 to about 218 psi), and most preferably between 1 to about 10 bar (14.5 to about 145 psi). The temperature preferably ranges between about 100° and 300° C., more preferably between about 150° and 300° C., and most preferably between about 200° and 300° C. The treatment time typically is between about 1 and 10 hours. The amount of catalyst used preferably ranges between about 0.01 and 50%, based on the weight of the resin, more preferably between about 0.5 and 40%, and most preferably between about 1 and 35%. In general, higher reaction temperatures or longer reaction times are required if the weight percent catalyst is low.

When the resins are made by polymerization of monomers in a solvent, the hydrotreating process of this invention can be carried out in the original polymerization solvent after the resins are neutralized and polymerization catalyst residues are removed. The solvent can be recovered after the treatment and recycled in the process. The process can also be carried out in an aromatic or aliphatic solvent solution of redissolved resin, or the resins can be treated in a molten state (neat). The process can be a batch or continuous process. In batch reactions, the catalyst can be recycled several times.

In the past, when the resins to be hydrogenated were made by polymerizing monomers in the presence of a chlorine-containing catalyst, feedstocks of the resins were typically dechlorinated before hydrogenation to prevent deactivation of the hydrogenation catalyst. A significant advantage of the process of this invention is that when a Ni/Zn oxide catalyst is used, the catalyst activity for color reduction remains essentially unchanged despite chlorine loads up to about 4.2%. At the same hydrogenation temperature and the high hydrogen pressures used in hydrogenation processes, the catalyst would be poisoned by these high chlorine loads and lose its activity.

Using the process of this invention, the color of aliphatic hydrocarbon resins is preferably lightened to less than Gardner 3, more preferably less than Gardner 1. The color of aromatic resins is preferably lightened to Gardner 5 or less, preferably Gardner 3 or less, and most preferably less than Gardner 1. The color of mixed aromatic/aliphatic resins is preferably lightened to Gardner 3, more preferably less than Gardner 1.

After hydrotreating, an antioxidant is generally added to improve heat and color stability, e.g., butylated hydroxytoluene or IRGANOX® 1010, a hindered phenol available from Ciba-Geigy, Hawthorne, N.Y., U.S.A. IRGANOX® 1010 is tetrakis[methylene(3,5-di-tert-butyl-4-hydroxyhydrocinnamate)] methane. The antioxidant is preferably used in an amount of about 0.05 to 1.0% by weight based on the total weight of the resin.

The light colored resins prepared by the process of this invention can be used in all known applications for hydrocarbon resins and hydrogenated hydrocarbon resins, such as tackifiers for hot melt adhesives and hot melt pressure sensitive adhesives. These adhesives can be used, for example, in nonwoven products such as feminine care products and disposable diapers, and in packaging tape and roadmarking compositions. The light colored resins made by the process of this invention can be used with a wide variety of polymers in these adhesive compositions, for example, styrene-isoprene-styrene, styrene-butadiene-styrene, styrene/ethylene-butylene/styrene, ethylene/butylene/acrylate, and ethylene/methacrylate polymers, as well as styrene/butadiene rubbers, and natural rubbers.

The Mettler Drop Softening Point (MDSP) is determined using a modified ASTM D 3461-76 method on the Mettler FP800 thermosystem consisting of the FP800 central processor and the FP83 dropping cell available from Mettler Instrumentation B.V., Tiel, the Netherlands. The sample cup used is a modified type ME 18732 with an opening of 4.5 mm. A starting temperature of approximately 15° C. below the expected softening point is chosen and a heating rate of 3° C./min is used.

MMAP is the mixed methylcyclohexane aniline cloud point, which is determined using a modified ASTM D 611-82 (1987) procedure. Methylcyclohexane is substituted for the heptane used in the standard test procedure. The procedure uses resin/aniline/methylcyclohexane in a ratio of ½/1 (5 g/10 ml/5 ml) and the cloud point is determined by cooling a heated, clear blend of the three components until complete turbidity just occurs. Hydrogenation of the unsaturated portion of a resin, particularly aromatic unsaturation, would result in an increase in the MMAP. In the process of this invention, the difference between the MMAP of the resin before hydrotreating and the MMAP after hydrotreating is 5° C. or less, preferably 3° C. or less and most preferably 2° C. or less, indicating that the content of carbon-carbon double bonds in the resin is essentially unchanged.

To determine Gardner color, 50 weight percent resin is mixed with reagent grade toluene at room temperature until it dissolves. The color of the resin solution is determined according to standard method ISO 4630 (also ASTM D 1544-80) on the LICO-200 photometer available from Dr. Lange, Nederland B.V., Kesteren, the Netherlands. The color values range from 1 to 18, with 18 being the darkest. A color of less than Gardner 1 indicates a water white solution.

In this specification all parts and percentages are by weight unless otherwise noted.

EXAMPLE 1

This example describes the hydrotreatment of a C-9 hydrocarbon resin.

Hercures® A120 C-9 hydrocarbon resin was dissolved in an aliphatic solvent (35% resin by weight) and placed in a fixed basket, stirred autoclave. Hercures® A120 hydrocarbon resin is available from Hercules BV, Middelburg, the Netherlands. The resin feedstock typically contains styrene, alpha-methylstyrene, vinyltoluenes, indene and alkyl-substituted indenes as reactive compounds, and is polymerized using a $BF_3$ catalyst. A pelleted Ni/ZnO hydrogenation catalyst on a $SiO_2$ carrier was activated at 250° C. under hydrogen and the evolving water was removed by a nitrogen purge. The activated catalyst (350 g) was then added to 2850 g of the resin solution at reaction temperature. The catalyst is Type H10126 RS, available from Katalysatorenwerke Hüls GmbH, Marl, Germany. The hydrotreatment was carried out at $10\times10^5$ Pascals (Pa) (10 bar or 145 psi) hydrogen pressure for 2.5 hours at 265° C.

After filtration, the resulting resin was isolated by conventional stripping techniques, followed by a steam sparge at 210° C.

The hydrotreated resin had a Gardner color (G) of 0.3 measured as 50% resin in toluene; a Mettler drop softening point (MDSP) of 125.1° C., and a mixed methyl aniline cloudpoint (MMAP) of 4° C. The untreated C-9 resin had a Gardner color of 5.4, a MDSP of 128.1° C., and a MMAP of 2° C.

EXAMPLE 2

This example describes the hydrotreatment of a C-9 hydrocarbon resin that was still dissolved in the polymerization solvent.

The C-9 feedstock used was Hercures® A120 hydrocarbon resin, available from Hercules BV, Middelburg, the Netherlands. The resin was still dissolved in the polymerization solvent containing about 70% resin and 30% oligomeric oils and recycled, unreacted resin oils. The low boiling fraction had already been removed by partial distillation.

A pelleted Ni/ZnO catalyst on a $SiO_2$ carrier was used as the hydrogenation catalyst. Before reaction the catalyst was activated at 250° C. under hydrogen, and evolving water was removed by a nitrogen purge. The catalyst was Type H10126 RS, available from Katalysatorenwerke Hüls GmbH, Marl, Germany. The activated catalyst (350 g) was added to 2500 g of the resin solution at reaction temperature. The hydrotreatment was carried out at $10\times10^5$ Pa (10 bar, 145 psi) hydrogen pressure for 8 hours at 265° C.

After filtration, the resulting resin was isolated by conventional stripping techniques, followed by a steam sparge at 210° C.

The resulting resin had a Gardner color of 0.8 measured as 50% resin in toluene and a MMAP of 3° C. The untreated C-9 resin had a Gardner color of 5.4 and a MMAP of 2° C.

EXAMPLE 3

This example describes the hydrotreatment of an aromatic-modified C-5 hydrocarbon resin that was still dissolved in the solvent that was used for polymerization.

The C-5 resin used was Hercotac® 205 hydrocarbon resin, available from Hercules BV, Middelburg, the Netherlands. The resin is made from the C-9 resin described in Example 1 and piperylene concentrate. The major components of the piperylene concentrate were pentenes; (di-)cyclopentadiene; trans-pentadiene-1,3; cyclopentene; cis-pentadiene-1,3 and alkanes.

The resin was still dissolved in the solvent used for the polymerization containing about 70% resin and 30% oligomeric oils and recycled, unreacted resin oils/piperylene concentrate. The low boiling fraction of the polymerizate had already been removed by a partial distillation.

The catalyst used for the hydrotreatment was pelleted Ni/ZnO on a $SiO_2$ carrier. Before reaction the catalyst was activated at 250° C. under hydrogen, and evolving water was removed by a nitrogen purge. The catalyst was Type H10126 RS, available from Katalysatorenwerke Hüls GmbH, Marl, Germany. The activated catalyst (350 g) was added to 2000 g of the resin solution at reaction temperature. The hydrotreatment was carried out at $10\times10^5$ Pa (10 bar, 145 psi) hydrogen pressure for 8 hours at 265° C.

After filtration, the resulting resin was isolated by conventional stripping techniques followed by a steam sparge at 210° C.

The resulting resin had a Gardner color of 2.1 measured as 50% resin in toluene, and a MMAP of 44° C. The untreated C-5 resin had a Gardner color of 7.0 and a MMAP of 39° C.

EXAMPLE 4

This example describes the effect of chlorine uptake on the decolorization activity of the catalyst.

The catalyst used was pelleted Ni/ZnO on a $SiO_2$ carrier and is available as Type H10111 RS from Katalysatorenwerke Hüls GmbH, Marl, Germany. The same batch of catalyst (100 g) was used for six successive hydrotreatment runs. In each run, a solution of 1500 g of Hercures® A101 hydrocarbon resin containing 416 mg/kg chlorine in 1500 g of aliphatic diluent was hydrotreated in a fixed bed, stirred autoclave for 3–5 hours at 265° C. using a hydrogen pressure of $10\times10^5$ Pa (10 bar, 145 psi). Hercures® A101 is a C-9 aromatic resin available from Hercules BV, Middelburg, the Netherlands. During each run the decolorization activity was calculated from δE color reduction. The chlorine uptake by the catalyst was calculated from the chlorine reduction in the resin. The results are shown in Table 1.

TABLE 1

|  | Run No. | | |
| --- | --- | --- | --- |
|  | 2 | 4 | 6 |
| Feed | | | |
| A101 ® C-9 aromatic resin | 1500 g | 1500 g | 1500 g |
| Aliphatic diluent | 1500 g | 1500 g | 1500 g |
| Catalyst | | | |
| Ni/ZnO | 100 g | 100 g | 100 g |
| Chlorine uptake % | 1.8 | 3.0 | 4.2 |
| Activity | | | |
| Decolorization k (δE) | 1.9 | 1.8 | 1.7 |

Calculations:
Total color difference (δE) from Hunter Lab color scale $$\delta E = \sqrt{(\delta L)^2 + (\delta a)^2 + (\delta b)^2}$$

Activity (k)

$$k = \left( \ln \frac{C0}{Ct} \right) \times \frac{Wr}{Wc \times t}$$

Where

C0=Color at time=0 (Start of reaction)
Ct=Color at time=t hour
Wr=Weight resin (g)
Wc=Weight catalyst (g)
t=Time (h)

The results show that the activity for color reduction k(δE) remains practically unchanged despite chlorine loads of the catalyst up to 4.2%.

EXAMPLE 5

This example describes the hydrotreating of a C-5 hydrocarbon resin that was still dissolved in the solvent used for the polymerization.

The resin used was Hercures® C hydrocarbon resin, available from Hercules BV, Middelburg, the Netherlands. The resin was prepared from piperylene concentrate using an AlCl$_3$ catalyst. The major components of the concentrate were pentenes; (di-) cyclopentadienes; trans-pentadiene-1,3; cyclopentene; cis-pentadiene-1,3 and alkanes. The resin was still dissolved in the polymerization solvent containing about 70% resin and 30% oligomeric oils and recycled unreacted piperylene concentrate. The low boiling fraction had already been removed by a partial distillation.

The catalyst used for the hydrotreatment was pelleted Ni/ZnO on a SiO$_2$ carrier, available as type H10126 RS from Katalysatorenwerke Hüls GmbH, Marl, Germany. Before reaction the catalyst was activated at 250° C. under hydrogen, and evolving water was removed by a nitrogen purge. The catalyst (350 g) was added to 2000 g of the resin solution at reaction temperature. The hydrotreatment was carried out at 10×10$^5$ Pa (10 bar, 145 psi) hydrogen pressure for 6 hours at 265° C.

After filtration, the resulting resin was isolated by conventional stripping techniques followed by a steam sparge at 210° C.

The resulting resin had a Gardner color of 1.3 measured as 50% resin in toluene, and a MMAP of 99° C. An untreated C-5 resin had a Gardner color of 6.3 and a MMAP of 94° C.

EXAMPLE 6

This example describes the hydrotreatment of an aromatic-modified C-5 hydrocarbon resin.

Hercotac® 205 hydrocarbon resin was dissolved in an aliphatic solvent (35% resin by weight) and dechlorinated by a conventional method to prevent deactivation of the catalyst by chlorine. Hercotac® 205 is an aromatic-modified C-5 hydrocarbon resin made from the C-9 resin described in Example 1 and the piperylene concentrate described in Example 3, using an AlCl$_3$ catalyst. The resin is available from Hercules BV, Middelburg, the Netherlands. The catalyst used for the hydrotreatment was a palladium-on-carbon extrudate, available as Type X4560 from Engelhard, Rome, Italy. The catalyst (100 g) was added to 2850 g of the resin solution at reaction temperature. The hydrotreatment was carried out at 10×10$^5$ Pa (10 bar, 145 psi) hydrogen pressure for 4 hours at 265° C.

After filtration, the resulting resin was isolated by conventional stripping techniques followed by a steam sparge at 210° C.

The resulting resin had a Gardner color of 4.0 measured as 50% resin in toluene, and a MMAP of 37° C. The untreated C-5 resin had a Gardner color of 6.6 and a MMAP of 33° C.

It is not intended that the examples given here should be construed to limit the invention, but rather they are submitted to illustrate some of the specific embodiments of the invention. Various modifications and variations of the present invention can be made without departing from the scope of the appended claims.

We claim:

1. A process for lightening the color of hydrocarbon resins having carbon-carbon double bonds and containing color bodies, said process comprising providing a hydrocarbon resin having a weight average molecular weight (Mw) of about 250 to about 10,000 wherein the resin is selected from the group consisting of C-5 hydrocarbon resins, C-9 hydrocarbon resins, mixed C-5/C-9 hydrocarbon resins, vinyl aromatic-modified C-5 hydrocarbon resins, dicyclopentadiene resins, aromatic-modified dicyclopentadiene resins, terpene resins, terpene-phenolic resins, mixed C-9/C-4 resins, and coumerone-indene resins, contacting the resin with hydrogen at a hydrogen pressure of about 14.5 to 290 psi at a temperature range between about 100° C. and 300° C. in the presence of a nickel/zinc oxide catalyst that promotes hydrogenation of the color bodies without substantially changing the softening point or the content of carbon-carbon double bonds in the resin producing a hydrotreated resin.

2. The process of claim 1, wherein the hydrogen pressure is about 14.5 to 218 psi.

3. The process of claim 2, wherein the hydrogen pressure is about 14.5 to 145 psi.

4. The process of claim 1, wherein the catalyst is used directly.

5. The process of claim 1, wherein the catalyst is carried on a support.

6. The process of claim 5, wherein the support is selected from the group consisting of silica, aluminia and carbon.

7. The process of claim 5, wherein the support comprises silica.

8. The process of claim 1, wherein the catalyst activity for color reduction remains essentially unchanged at chlorine loads up to about 4.2% by weight.

9. The process of claim 1, wherein the resin is an aliphatic hydrocarbon resin and the Gardner color of the resin is less than 3 after the contacting step.

10. The process of claim 9, wherein the Gardner color of the resin is less than 1 after the contacting step.

11. The process of claim 1, wherein the resin is an aromatic hydrocarbon resin and the Gardner color of the resin is 5 or less after the contacting step.

12. The process of claim 11, wherein the Gardner color of the resin is 3 or less after the contacting step.

13. The process of claim 11, wherein the Gardner color of the resin is less than 1 after the contacting step.

14. The process of claim 1, wherein the hydrocarbon resin contains color body precursors and the color body precursors are not hydrogenated during the contacting step.

15. The process of claim 1, wherein the resin is prepared by polymerization of monomers in a solvent and the contacting step takes place while the resin is dissolved in the solvent used for the polymerization.

16. The process of claim 15, wherein the polymerization solvent is recovered after said contacting step and is recycled in the process.

17. The process of claim 1, wherein the resin is prepared by polymerization of monomers in a solvent and the contacting step takes place while the resin is dissolved in the solvent used for the polymerization.

18. The process of claim 1, wherein the process is a batch process.

19. The process of claim 18, wherein the catalyst is recycled several times.

20. The process of claim 1, wherein the process is a continuous process.

21. The process of claim 20, wherein the polymerization solvent is recovered after the contacting step and is recycled in the process.

22. The process of claim 1, wherein the process further comprises adding an antioxidant to the resin after hydrotreating.

23. The process of claim 22, wherein the antioxidant is used in an amount of about 0.05 to 1.0% by weight based on the total weight of the total weight of the resin.

24. The process of claim 23, wherein the antioxidant comprises butylated hydroxytoluene.

25. The process of claim 23, wherein the antioxidant comprises tetrakis[methylene(3,5-di-tert-butyl-4-hydroxyhydrocinnamate)] methane.

26. The process of claim 1, wherein the contacting step takes place while the resin is in the molten state.

27. The process of claim 2, wherein the catalyst is carried on a support.

28. The process of claim 2, wherein the process is a batch process.

29. The process of claim 2, wherein the process is a continuous process.

30. The process of claim 2, wherein the catalyst activity for color reduction remains essentially unchanged at chlorine loads up to about 4.2% by weight.

31. The process of claim 2, wherein the process further comprises adding an antioxidant to the resin after hydrotreating.

32. The process of claim 6, wherein the catalyst activity for color reduction remains essentially unchanged at chlorine loads up to about 4.2% by weight.

33. The process of claim 32, wherein the hydrocarbon resin contains color body precursors and the color body precursors are not hydrogenated during the contacting step.

34. The process of claim 33, wherein the resin is an aliphatic hydrocarbon resin and the Gardner color of the resin is less than 3 after the contacting step.

35. The process of claim 34, wherein the Gardner color of the resin is less than 1 after the contacting step.

36. The process of claim 33, wherein the resin is an aromatic hydrocarbon resin and the Gardner color of the resin is 5 or less after the contacting step.

37. The process of claim 36, wherein the Gardner color of the resin is less than 1 after the contacting step.

38. A hydrotreated resin produced by the process of claim 1.

39. The hydrotreated resin of claim 38, wherein the difference between the hydrotreated resin's mixed methylcyclohexane aniline cloud point, MMAP, before the process and after the process is 5° C. or less.

40. The hydrotreated resin of claim 39, wherein the difference between the hydrotreated resin's mixed methylcyclohexane aniline cloud point, MMAP, before the process and after the process is 3° C. or less.

41. The hydrotreated resin of claim 40, wherein the difference between the hydrotreated resin's mixed methylcyclohexane aniline cloud point, MMAP, before the process and after the process is 2° C. or less.

42. The hydrotreated resin of claim 38, wherein the hydrotreated resin is an aliphatic hydrocarbon resin and the Gardner color of the hydrotreated resin is less than 3.

43. The hydrotreated resin of claim 42, wherein the Gardner color of the hydrotreated resin is less than 1.

44. The hydrotreated resin of claim 38, wherein the hydrotreated resin is an aromatic hydrocarbon resin and the Gardner color of the hydrotreated resin is 5 or less.

45. The hydrotreated resin of claim 44, wherein the Gardner color of the hydrotreated resin is less than 3.

46. The hydrotreated resin of claim 45, wherein the Gardner color of the hydrotreated resin is less than 1.

* * * * *